US011132693B1

(12) United States Patent
Sahni et al.

(10) Patent No.: US 11,132,693 B1
(45) Date of Patent: *Sep. 28, 2021

(54) USE LIMITATIONS FOR SECONDARY USERS OF FINANCIAL ACCOUNTS

(71) Applicant: Wells Fargo Bank, N.A., San Francisco, CA (US)

(72) Inventors: Bipin Sahni, Pleasanton, CA (US); Uma Meyyappan, Fremont, CA (US); Stephen M. Ellis, Tahoe City, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,238

(22) Filed: Oct. 14, 2019

Related U.S. Application Data

(63) Continuation of application No. 14/459,559, filed on Aug. 14, 2014, now Pat. No. 10,445,739.

(51) Int. Cl.
| | |
|---|---|
| *G06Q 20/10* | (2012.01) |
| *G06Q 20/40* | (2012.01) |
| *G06Q 40/02* | (2012.01) |
| *G06Q 20/38* | (2012.01) |

(52) U.S. Cl.
CPC ........... *G06Q 20/405* (2013.01); *G06Q 20/10* (2013.01); *G06Q 20/382* (2013.01); *G06Q 40/02* (2013.01)

(58) Field of Classification Search
USPC .......................................................... 705/44
See application file for complete search history.

(56) References Cited

U.S. PATENT DOCUMENTS

| | | | |
|---|---|---|---|
| 5,412,192 A | 5/1995 | Hoss | |
| 5,778,067 A | 7/1998 | Jones et al. | |
| 6,016,484 A | 1/2000 | Williams et al. | |
| 6,018,724 A | 1/2000 | Arent | |

(Continued)

FOREIGN PATENT DOCUMENTS

| | | |
|---|---|---|
| WO | WO-2011/113121 A1 | 9/2011 |
| WO | WO-2012/139003 A2 | 10/2012 |

(Continued)

OTHER PUBLICATIONS

EMV, "Payment Tokenisation Specification Technical Framework", 2014 EMVCO, LLC. 84 pages.

(Continued)

*Primary Examiner* — Hani M Kazimi
*Assistant Examiner* — Hatem M Ali
(74) *Attorney, Agent, or Firm* — Foley & Lardner LLP

(57) ABSTRACT

Systems and methods for sharing financial accounts via a mobile wallet system are described. The mobile wallet system allows for a master wallet associated with a primary account holder to provide limited access to an account of the primary account holder to secondary users. The primary account holder can limit a secondary user's level of access to the funds in the account by establishing spending rules and limits for each secondary user. The rules and limits restrict the secondary users' abilities to spend funds in the account. The rule and limit types include spending limits, types of goods and services restrictions, store specific restrictions, purpose of purchase rules, purchase timing rules, geographic restrictions, group purchase rules.

20 Claims, 6 Drawing Sheets

(56) References Cited

U.S. PATENT DOCUMENTS

| | | |
|---|---|---|
| 6,615,194 B1 | 9/2003 | Deutsch et al. |
| 6,865,547 B1 | 3/2005 | Brake et al. |
| 6,873,974 B1 | 3/2005 | Schutzer |
| 7,765,481 B2 | 7/2010 | Dixon et al. |
| 7,822,206 B2 | 10/2010 | Birk et al. |
| 7,827,057 B1 | 11/2010 | Walker et al. |
| 7,909,243 B2 | 3/2011 | Merkow et al. |
| 7,930,225 B2 | 4/2011 | Wahlberg et al. |
| 7,945,776 B1 | 5/2011 | Atzmony et al. |
| 7,970,669 B1 | 6/2011 | Santos |
| 8,019,365 B2 | 9/2011 | Fisher |
| 8,078,140 B2 | 12/2011 | Baker et al. |
| 8,126,806 B1 | 2/2012 | Dimartino et al. |
| 8,160,959 B2 | 4/2012 | Rackley et al. |
| 8,215,560 B2 | 7/2012 | Granucci et al. |
| 8,280,788 B2 | 10/2012 | Perlman |
| 8,332,290 B1 | 12/2012 | Venturo et al. |
| 8,401,904 B1 | 3/2013 | Simakov et al. |
| 8,433,657 B2 | 4/2013 | Dinan |
| 8,452,257 B2 | 5/2013 | Granucci et al. |
| 8,467,766 B2 | 6/2013 | Rackley et al. |
| 8,468,587 B2 | 6/2013 | Blinn et al. |
| 8,489,067 B2 | 7/2013 | Rackley, III et al. |
| 8,504,699 B2 | 8/2013 | Vaughan et al. |
| 8,533,123 B2 | 9/2013 | Hart |
| 8,538,845 B2 | 9/2013 | Liberty |
| 8,548,908 B2 | 10/2013 | Friedman |
| 8,555,361 B2 | 10/2013 | Nakhjiri et al. |
| 8,566,237 B2 | 10/2013 | Forzley |
| 8,566,239 B2 | 10/2013 | Arthur et al. |
| 8,615,468 B2 | 12/2013 | Varadarajan |
| 8,627,424 B1 | 1/2014 | O'Malley et al. |
| 8,639,621 B1 | 1/2014 | Ellis et al. |
| 8,645,971 B2 | 2/2014 | Carlson et al. |
| 8,676,704 B2 | 3/2014 | Ledbetter et al. |
| 8,700,729 B2 | 4/2014 | Dua |
| 8,706,628 B2 | 4/2014 | Phillips |
| 8,725,576 B2 | 5/2014 | Fisher |
| 8,725,577 B2 | 5/2014 | Fisher |
| 8,732,080 B2 | 5/2014 | Karim |
| 8,744,966 B1 | 6/2014 | Amacker et al. |
| 8,750,901 B1 | 6/2014 | Gupta et al. |
| 8,768,830 B1 * | 7/2014 | Jorgensen .......... G06Q 20/3572 705/39 |
| 8,768,834 B2 | 7/2014 | Zacarias et al. |
| 8,774,781 B1 | 7/2014 | Speiser et al. |
| 8,781,955 B2 | 7/2014 | Schamer et al. |
| 8,831,677 B2 | 9/2014 | Villa-Real |
| 8,838,501 B1 | 9/2014 | Priebatsch |
| 8,843,125 B2 | 9/2014 | Kwon et al. |
| 8,843,417 B2 | 9/2014 | Hammad |
| 8,880,432 B2 | 11/2014 | Collins, Jr. |
| 8,924,246 B1 | 12/2014 | Chen et al. |
| 8,925,805 B2 | 1/2015 | Grigg et al. |
| 8,972,297 B2 | 3/2015 | Kay et al. |
| 8,977,251 B2 | 3/2015 | Grigg et al. |
| 8,989,712 B2 | 3/2015 | Wentker et al. |
| 9,020,836 B2 | 4/2015 | Fisher et al. |
| 9,026,460 B2 | 5/2015 | Grigg et al. |
| 9,027,109 B2 | 5/2015 | Wolberg-Stok et al. |
| 9,037,509 B1 | 5/2015 | Ellis et al. |
| 9,043,240 B2 | 5/2015 | Langus et al. |
| 9,098,190 B2 | 8/2015 | Zhou et al. |
| 9,177,307 B2 | 11/2015 | Ross et al. |
| 9,195,984 B1 | 11/2015 | Spector et al. |
| 9,208,488 B2 | 12/2015 | Liberty |
| 9,218,624 B2 | 12/2015 | Moghadam |
| 9,256,876 B2 | 2/2016 | Vasant Akole et al. |
| 9,286,606 B2 | 3/2016 | Diamond |
| 9,324,068 B2 | 4/2016 | Soundararajan |
| 9,361,616 B2 | 6/2016 | Zhou et al. |
| 9,652,770 B1 | 5/2017 | Kurani et al. |
| 9,691,058 B2 | 6/2017 | Epler et al. |
| 9,741,051 B2 | 8/2017 | Carpenter et al. |
| 9,805,363 B1 | 10/2017 | Rudnick et al. |
| 9,972,047 B1 | 5/2018 | Elliott et al. |
| 10,140,615 B2 | 11/2018 | Carpenter et al. |
| 10,169,812 B1 | 1/2019 | Bajgier et al. |
| 10,380,596 B1 | 8/2019 | Butler et al. |
| 10,445,739 B1 * | 10/2019 | Sahni ................ G06Q 20/382 |
| 10,515,356 B2 | 12/2019 | Cronic et al. |
| 2002/0032602 A1 | 3/2002 | Lanzillo et al. |
| 2003/0028481 A1 | 2/2003 | Flitcroft et al. |
| 2003/0040964 A1 | 2/2003 | Lacek |
| 2003/0055785 A1 | 3/2003 | Lahiri |
| 2003/0056096 A1 | 3/2003 | Albert et al. |
| 2004/0230535 A1 | 11/2004 | Binder et al. |
| 2004/0236632 A1 | 11/2004 | Maritzen et al. |
| 2004/0260646 A1 | 12/2004 | Berardi et al. |
| 2005/0021401 A1 | 1/2005 | Postrel |
| 2005/0043997 A1 | 2/2005 | Sahota et al. |
| 2005/0086492 A1 | 4/2005 | Nicodemus et al. |
| 2005/0138377 A1 | 6/2005 | First et al. |
| 2005/0184145 A1 | 8/2005 | Law et al. |
| 2005/0235363 A1 | 10/2005 | Hibbard et al. |
| 2006/0235795 A1 | 10/2006 | Johnson et al. |
| 2006/0253335 A1 | 11/2006 | Keena et al. |
| 2007/0170243 A1 | 7/2007 | Desany et al. |
| 2007/0174873 A1 | 7/2007 | Griggs |
| 2007/0198432 A1 | 8/2007 | Pitroda |
| 2007/0199061 A1 | 8/2007 | Byres et al. |
| 2007/0244811 A1 | 10/2007 | Tumminaro |
| 2008/0005006 A1 | 1/2008 | Tritt et al. |
| 2008/0006685 A1 | 1/2008 | Rackley, III et al. |
| 2008/0033878 A1 | 2/2008 | Krikorian et al. |
| 2008/0127317 A1 | 5/2008 | Nakhjiri |
| 2008/0203152 A1 | 8/2008 | Hammad et al. |
| 2008/0208742 A1 | 8/2008 | Arthur et al. |
| 2008/0242274 A1 | 10/2008 | Swanburg et al. |
| 2008/0243701 A1 | 10/2008 | Von Mueller |
| 2008/0319887 A1 | 12/2008 | Pizzi et al. |
| 2009/0048971 A1 | 2/2009 | Hathaway et al. |
| 2009/0157531 A1 | 6/2009 | Bui |
| 2009/0177563 A1 | 7/2009 | Bernstein et al. |
| 2009/0228966 A1 | 9/2009 | Parfene et al. |
| 2009/0271287 A1 | 10/2009 | Halpern |
| 2009/0319427 A1 | 12/2009 | Gardner et al. |
| 2010/0082481 A1 | 4/2010 | Lin et al. |
| 2010/0114724 A1 | 5/2010 | Ghosh et al. |
| 2010/0114731 A1 | 5/2010 | Kingston et al. |
| 2010/0114733 A1 | 5/2010 | Collas et al. |
| 2010/0125495 A1 | 5/2010 | Smith et al. |
| 2010/0191602 A1 | 7/2010 | Mikkelsen et al. |
| 2010/0205077 A1 * | 8/2010 | Hammad ................ G06Q 40/12 705/30 |
| 2011/0055080 A1 | 3/2011 | Ahlers et al. |
| 2011/0106674 A1 | 5/2011 | Perlman |
| 2011/0154466 A1 | 6/2011 | Harper et al. |
| 2011/0191160 A1 | 8/2011 | Blackhurst et al. |
| 2011/0196782 A1 | 8/2011 | Allen et al. |
| 2011/0251892 A1 | 10/2011 | Laracey |
| 2011/0270748 A1 | 11/2011 | Graham et al. |
| 2011/0289004 A1 | 11/2011 | Prakash et al. |
| 2011/0295748 A1 | 12/2011 | Woodriffe |
| 2011/0313918 A1 | 12/2011 | Lawson et al. |
| 2012/0011063 A1 | 1/2012 | Killian et al. |
| 2012/0018511 A1 | 1/2012 | Hammad |
| 2012/0022944 A1 | 1/2012 | Volpi |
| 2012/0078735 A1 | 3/2012 | Bauer et al. |
| 2012/0078751 A1 | 3/2012 | MacPhail et al. |
| 2012/0084210 A1 | 4/2012 | Farahmand |
| 2012/0110634 A1 | 5/2012 | Jakobsson |
| 2012/0130731 A1 | 5/2012 | Canetto |
| 2012/0143705 A1 | 6/2012 | Bhattacharya et al. |
| 2012/0150669 A1 | 6/2012 | Langley et al. |
| 2012/0150687 A1 | 6/2012 | Hart |
| 2012/0158589 A1 | 6/2012 | Katzin et al. |
| 2012/0185317 A1 | 7/2012 | Wong |
| 2012/0185387 A1 | 7/2012 | Doyle |
| 2012/0192254 A1 | 7/2012 | Garcia Perez et al. |
| 2012/0196586 A1 | 8/2012 | Grigg et al. |
| 2012/0197793 A1 | 8/2012 | Grigg et al. |
| 2012/0197794 A1 | 8/2012 | Grigg et al. |
| 2012/0209749 A1 | 8/2012 | Hammad et al. |

(56) References Cited

U.S. PATENT DOCUMENTS

| | | |
|---|---|---|
| 2012/0239417 A1 | 9/2012 | Pourfallah et al. |
| 2012/0253852 A1 | 10/2012 | Pourfallah et al. |
| 2012/0254021 A1 | 10/2012 | Wohied et al. |
| 2012/0271705 A1 | 10/2012 | Postrel |
| 2012/0271712 A1 | 10/2012 | Katzin et al. |
| 2012/0284130 A1 | 11/2012 | Lewis et al. |
| 2012/0290376 A1 | 11/2012 | Dryer et al. |
| 2012/0296720 A1 | 11/2012 | Pirillo |
| 2012/0303425 A1 | 11/2012 | Katzin et al. |
| 2012/0310774 A1 | 12/2012 | Chassin |
| 2012/0323762 A1 | 12/2012 | Kapur et al. |
| 2012/0330837 A1 | 12/2012 | Persaud et al. |
| 2013/0006848 A1 | 1/2013 | Kuttuva |
| 2013/0018777 A1 | 1/2013 | Klein |
| 2013/0018792 A1 | 1/2013 | Casey et al. |
| 2013/0030941 A1 | 1/2013 | Meredith et al. |
| 2013/0042261 A1 | 2/2013 | Tavormina et al. |
| 2013/0054454 A1 | 2/2013 | Purves et al. |
| 2013/0060679 A1 | 3/2013 | Oskolkov et al. |
| 2013/0060696 A1 | 3/2013 | Martin et al. |
| 2013/0060708 A1 | 3/2013 | Oskolkov et al. |
| 2013/0065555 A1 | 3/2013 | Baker et al. |
| 2013/0073365 A1 | 3/2013 | McCarthy |
| 2013/0073459 A1 | 3/2013 | Zacarias et al. |
| 2013/0080241 A1 | 3/2013 | Fisher |
| 2013/0110658 A1 | 5/2013 | Lyman et al. |
| 2013/0132854 A1 | 5/2013 | Raleigh et al. |
| 2013/0144663 A1 | 6/2013 | Qawami et al. |
| 2013/0151400 A1 | 6/2013 | Makhotin et al. |
| 2013/0166332 A1 | 6/2013 | Hammad |
| 2013/0185167 A1 | 7/2013 | Mestre et al. |
| 2013/0191227 A1 | 7/2013 | Pasa et al. |
| 2013/0191277 A1 | 7/2013 | O'Leary et al. |
| 2013/0191278 A1 | 7/2013 | O'Leary et al. |
| 2013/0200999 A1 | 8/2013 | Spodak et al. |
| 2013/0204785 A1 | 8/2013 | Monk et al. |
| 2013/0226751 A1 | 8/2013 | Friedholm et al. |
| 2013/0226799 A1 | 8/2013 | Raj |
| 2013/0232032 A1 | 9/2013 | Chaturvedi et al. |
| 2013/0238455 A1 | 9/2013 | Laracey |
| 2013/0246260 A1 | 9/2013 | Barten et al. |
| 2013/0246261 A1 | 9/2013 | Purves et al. |
| 2013/0246265 A1 | 9/2013 | Al-Sahli |
| 2013/0254102 A1 | 9/2013 | Royyuru |
| 2013/0260734 A1 | 10/2013 | Jain et al. |
| 2013/0262309 A1 | 10/2013 | Gadotti |
| 2013/0262316 A1 | 10/2013 | Hruska |
| 2013/0282588 A1 | 10/2013 | Hruska |
| 2013/0290121 A1 | 10/2013 | Simakov et al. |
| 2013/0290169 A1 | 10/2013 | Bathula et al. |
| 2013/0317928 A1 | 11/2013 | Laracey |
| 2013/0317984 A1 | 11/2013 | O'Leary et al. |
| 2013/0332344 A1 | 12/2013 | Weber |
| 2013/0332353 A1 | 12/2013 | Aidasani et al. |
| 2014/0006129 A1 | 1/2014 | Heath |
| 2014/0006276 A1 | 1/2014 | Grigg et al. |
| 2014/0012750 A1 | 1/2014 | Kuhn et al. |
| 2014/0019352 A1 | 1/2014 | Shrivastava |
| 2014/0019360 A1 | 1/2014 | Yang |
| 2014/0038546 A1 | 2/2014 | Neal et al. |
| 2014/0058855 A1 | 2/2014 | Hussein et al. |
| 2014/0058936 A1 | 2/2014 | Ren et al. |
| 2014/0074655 A1 | 3/2014 | Lim et al. |
| 2014/0074724 A1 | 3/2014 | Gordon et al. |
| 2014/0081783 A1 | 3/2014 | Paranjape et al. |
| 2014/0081854 A1 | 3/2014 | Sanchez et al. |
| 2014/0089171 A1 | 3/2014 | Gandhi |
| 2014/0096215 A1 | 4/2014 | Hessler |
| 2014/0100975 A1 | 4/2014 | Van |
| 2014/0101048 A1 | 4/2014 | Gardiner et al. |
| 2014/0108254 A1 | 4/2014 | Lee |
| 2014/0114856 A1 | 4/2014 | Jung et al. |
| 2014/0122310 A1 | 5/2014 | Torrens et al. |
| 2014/0122563 A1 | 5/2014 | Singh et al. |
| 2014/0129357 A1 | 5/2014 | Goodwin |
| 2014/0129442 A1 | 5/2014 | Hanson et al. |
| 2014/0136352 A1 | 5/2014 | Ramakrishna et al. |
| 2014/0180849 A1 | 6/2014 | Kimberg et al. |
| 2014/0188718 A1 | 7/2014 | Grossman et al. |
| 2014/0188719 A1 | 7/2014 | Poornachandran et al. |
| 2014/0207680 A1 | 7/2014 | Rephlo |
| 2014/0214640 A1 | 7/2014 | Mallikarjunan et al. |
| 2014/0222670 A1 | 8/2014 | Concannon |
| 2014/0244506 A1 | 8/2014 | Gramling |
| 2014/0250003 A1 | 9/2014 | Levchin et al. |
| 2014/0258135 A1 | 9/2014 | Park et al. |
| 2014/0279097 A1 | 9/2014 | Alshobaki et al. |
| 2014/0279469 A1 | 9/2014 | Mendes |
| 2014/0279489 A1 | 9/2014 | Russell et al. |
| 2014/0279566 A1 | 9/2014 | Verma et al. |
| 2014/0282068 A1 | 9/2014 | Levkovitz et al. |
| 2014/0297435 A1 | 10/2014 | Wong |
| 2014/0297520 A1 | 10/2014 | Levchin et al. |
| 2014/0297524 A1 | 10/2014 | Ravindranath et al. |
| 2014/0304095 A1 | 10/2014 | Fisher |
| 2014/0310173 A1 | 10/2014 | Caldwell |
| 2014/0310182 A1 | 10/2014 | Cummins |
| 2014/0337175 A1 | 11/2014 | Katzin et al. |
| 2014/0337621 A1 | 11/2014 | Nakhimov |
| 2014/0344153 A1 | 11/2014 | Raj et al. |
| 2014/0347265 A1 | 11/2014 | Aimone et al. |
| 2014/0351072 A1 | 11/2014 | Wieler et al. |
| 2014/0351126 A1 | 11/2014 | Priebatsch |
| 2014/0351130 A1 | 11/2014 | Cheek et al. |
| 2014/0365363 A1 | 12/2014 | Knudsen et al. |
| 2014/0376576 A1 | 12/2014 | Jespersen et al. |
| 2014/0379576 A1* | 12/2014 | Marx ............... G06Q 20/2295 705/44 |
| 2015/0019944 A1 | 1/2015 | Kalgi |
| 2015/0026049 A1 | 1/2015 | Theurer et al. |
| 2015/0032626 A1 | 1/2015 | Dill et al. |
| 2015/0032627 A1 | 1/2015 | Dill et al. |
| 2015/0035643 A1 | 2/2015 | Kursun |
| 2015/0046241 A1 | 2/2015 | Salmon et al. |
| 2015/0046339 A1 | 2/2015 | Wong et al. |
| 2015/0074774 A1 | 3/2015 | Nema et al. |
| 2015/0088633 A1 | 3/2015 | Salmon et al. |
| 2015/0089568 A1 | 3/2015 | Sprague et al. |
| 2015/0095075 A1 | 4/2015 | Breuer et al. |
| 2015/0095219 A1 | 4/2015 | Hurley |
| 2015/0100442 A1 | 4/2015 | Van Heerden et al. |
| 2015/0112781 A1 | 4/2015 | Clark et al. |
| 2015/0140960 A1 | 5/2015 | Powell et al. |
| 2015/0154588 A1 | 6/2015 | Purves et al. |
| 2015/0178693 A1 | 6/2015 | Solis |
| 2015/0186875 A1 | 7/2015 | Zhang et al. |
| 2015/0186886 A1* | 7/2015 | Schwalb ............... G06Q 40/02 705/44 |
| 2015/0187021 A1 | 7/2015 | Moring et al. |
| 2015/0193869 A1 | 7/2015 | Del Vecchio et al. |
| 2015/0220914 A1 | 8/2015 | Purves et al. |
| 2015/0229622 A1 | 8/2015 | Grigg et al. |
| 2015/0254698 A1 | 9/2015 | Bondesen et al. |
| 2015/0254699 A1 | 9/2015 | Bondesen et al. |
| 2015/0278799 A1 | 10/2015 | Palanisamy |
| 2015/0287015 A1 | 10/2015 | Kaplinger et al. |
| 2015/0287037 A1 | 10/2015 | Salmon et al. |
| 2015/0319158 A1 | 11/2015 | Kumnick |
| 2015/0324768 A1 | 11/2015 | Filter et al. |
| 2015/0332252 A1 | 11/2015 | Shahrokhi et al. |
| 2015/0339662 A1 | 11/2015 | Huang et al. |
| 2015/0371234 A1 | 12/2015 | Huang et al. |
| 2015/0371326 A1 | 12/2015 | Montesano et al. |
| 2016/0004876 A1 | 1/2016 | Bye et al. |
| 2016/0012465 A1 | 1/2016 | Sharp |
| 2016/0026999 A1 | 1/2016 | Kurian |
| 2016/0042341 A1 | 2/2016 | Griffin et al. |
| 2016/0042344 A1 | 2/2016 | Thimmana et al. |
| 2016/0048828 A1 | 2/2016 | Lee |
| 2016/0063496 A1 | 3/2016 | Royyuru et al. |
| 2016/0065370 A1 | 3/2016 | Le Saint et al. |
| 2016/0086170 A1 | 3/2016 | Hurt et al. |
| 2016/0086179 A1 | 3/2016 | Barbier |
| 2016/0092696 A1 | 3/2016 | Guglani et al. |

(56) References Cited

U.S. PATENT DOCUMENTS

| | | |
|---|---|---|
| 2016/0092866 A1 | 3/2016 | Liberty et al. |
| 2016/0092868 A1 | 3/2016 | Salama et al. |
| 2016/0092874 A1 | 3/2016 | O'Regan et al. |
| 2016/0125396 A1 | 5/2016 | Brickell et al. |
| 2016/0125409 A1 | 5/2016 | Meredith et al. |
| 2016/0125417 A1 | 5/2016 | Huang et al. |
| 2016/0132875 A1 | 5/2016 | Blanco et al. |
| 2016/0140555 A1 | 5/2016 | Scipioni |
| 2016/0162889 A1 | 6/2016 | Badenhorst |
| 2016/0342962 A1 | 11/2016 | Brown et al. |
| 2016/0342992 A1 | 11/2016 | Lee |
| 2016/0379215 A1 | 12/2016 | Clerkin |
| 2017/0017958 A1 | 1/2017 | Scott et al. |
| 2017/0061402 A1 | 3/2017 | Mobin et al. |
| 2017/0061406 A1 | 3/2017 | Adams et al. |
| 2017/0164139 A1 | 6/2017 | Deselaers et al. |
| 2017/0193468 A1 | 7/2017 | Chougule et al. |
| 2017/0228715 A1 | 8/2017 | Gurunathan |
| 2018/0007052 A1 | 1/2018 | Quentin |
| 2018/0047016 A1 | 2/2018 | Sarin |
| 2018/0068308 A1 | 3/2018 | Gupta et al. |
| 2018/0082283 A1 | 3/2018 | Sharma |
| 2018/0157336 A1 | 6/2018 | Harris et al. |
| 2018/0322488 A1 | 11/2018 | Arana et al. |
| 2018/0365675 A1 | 12/2018 | Sivaraman |
| 2018/0374076 A1 | 12/2018 | Wheeler |
| 2019/0304029 A1 | 10/2019 | Murray et al. |

FOREIGN PATENT DOCUMENTS

| | | |
|---|---|---|
| WO | WO-2013/079793 A1 | 6/2013 |
| WO | WO-2014/012138 A1 | 1/2014 |
| WO | WO-2014/111888 A1 | 7/2014 |
| WO | WO-2014/207615 A1 | 12/2014 |
| WO | WO-2015/016780 A1 | 2/2015 |
| WO | WO-2015/023172 A2 | 2/2015 |
| WO | WO-2016/009198 A1 | 1/2016 |
| WO | WO-2016/053975 A1 | 4/2016 |
| WO | WO-2016/097879 | 6/2016 |
| WO | WO-2016/172107 A1 | 10/2016 |
| WO | WO-2016/196054 A1 | 12/2016 |

OTHER PUBLICATIONS

"Cashcloud Mobile eWallet", FinTech Forum Exchange, Jul. 1, 2016. 4 pages.

"Cashcloud mobile eWallet", Popote Payments, www.popotepayments.com, 2016. 6 pages.

A Smart Card Alliance Payments Council White Paper; Publication date: Sep. 2011; Publication No. PC-11002; 191 Clarksville Rd. Princeton Junction, NJ 08550 www.smartcardalliance.org (Year: 2011).

How to Control Children's Spending on Debit Cards | Money | by Jill Paperworth, May 10, 2009, https:www.theguardian.com/money/2009/mar/.../children-debit-cards-online-spend . . . (Year: 2009).

Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/profile/Tatsuo_Nakajima/publication/220982951_UbiPay_minimizing_transaction_costs_with_smart_mobile_payments/links/548e9dad0cf225bf66a607bb.pdf on Oct. 30, 2015, 8 pages.

Smart Card Alliance, "The Mobile Payments and NFC Landscape: A U.S. Perspective," Sep. 2011. 53 pages.

White, Ron, "How Computers Work", Que Publishing, 7th Ed, Oct. 15, 2003, p. 4. 23 pages.

The University of Alaska staff, Managing Finance Reports with Vista Plus, Aug. 2008, The University of Alaska, web, 2-20 (Year: 2008).

* cited by examiner

USE LIMITATIONS FOR SECONDARY USERS OF FINANCIAL ACCOUNTS

CROSS-REFERENCE TO RELATED PATENT APPLICATIONS

This application is a continuation of U.S. patent application Ser. No. 14/459,559, entitled "USE LIMITATIONS FOR SECONDARY USERS OF FINANCIAL ACCOUNTS," filed Aug. 14, 2014, incorporated herein by reference in its entirety.

FIELD

The present disclosure relates generally systems that use mobile devices to initiate fund transfer requests.

BACKGROUND

Many financial institutions offer mobile banking applications. The banking applications typically provide the customers of the financial institution access to information about the customers' accounts from customer computing devices, such as smartphones, portable media players, tablet computers, and other portable computing devices. The information includes account balances, transaction history, and the like. Some mobile banking applications allow customers to perform simple financial transactions, such as transferring money between accounts, sending a check to payees, and paying bills. Enhanced mobile banking applications to facilitate greater account control would be desirable.

SUMMARY OF THE INVENTION

One embodiment of the invention relates to a computer-implemented method. The method includes receiving, by a processor of a financial institution device from a customer computing device associated with a primary account holder, a request to add a secondary user to an account of the primary account holder. The method further includes receiving, by the processor and from the customer computing device, information relating to the secondary user. The method includes receiving, by the processor and from the customer computing device, rule and limitation information relating to at least one rule or limitation that restricts the secondary user's ability to spend funds from the account. The method further includes updating, by the processor, at least one database based on the information relating to the secondary user and the rule and limitation information.

One embodiment of the invention relates to a financial institution computing system. The system includes an account database, a mobile wallet profile database, a network interface, and a processor. The processor is configured to receive a request to add a secondary user to an account of the primary account holder from a customer computing device associated with a primary account holder. The processor is further configured to receive information relating to the secondary user. The processor is configured to receive rule and limitation information relating to at least one rule or limitation that restricts the secondary user's ability to spend funds from the account. The processor is further configured to update at least one database based on the information relating to the secondary user and the rule and limitation information.

One embodiment of the invention relates to a non-transitory computer readable media having computer-executable instructions embodied therein that, when executed by a processor of a financial institution computing system, cause the financial institution computing system to perform operations to restrict a primary user's access to an account owned by a primary account holder. The operations include receive a request to add the secondary user to the account of the primary account holder from a customer computing device associated with a primary account holder. The operations further include receive information relating to the secondary user. The operations include receive rule and limitation information relating to at least one rule or limitation that restricts the secondary user's ability to spend funds from the account. The operations further include update at least one database based on the information relating to the secondary user and the rule and limitation information.

DETAILED DESCRIPTION

Referring to the figures generally, systems and methods for sharing financial accounts via a mobile wallet system are described. The mobile wallet system allows for a master wallet associated with a primary account holder to provide limited access to an account of the primary account holder to secondary users. The primary account holder can limit a secondary user's level of access to the funds in the account by establishing spending rules and limits for each secondary user. The rules and limits restrict the secondary users' abilities to spend funds in the account. The rule and limit types include spending limits, types of goods and services restrictions, store specific restrictions, purpose of purchase rules, purchase timing rules, geographic restrictions, group purchase rules.

Figure 1:
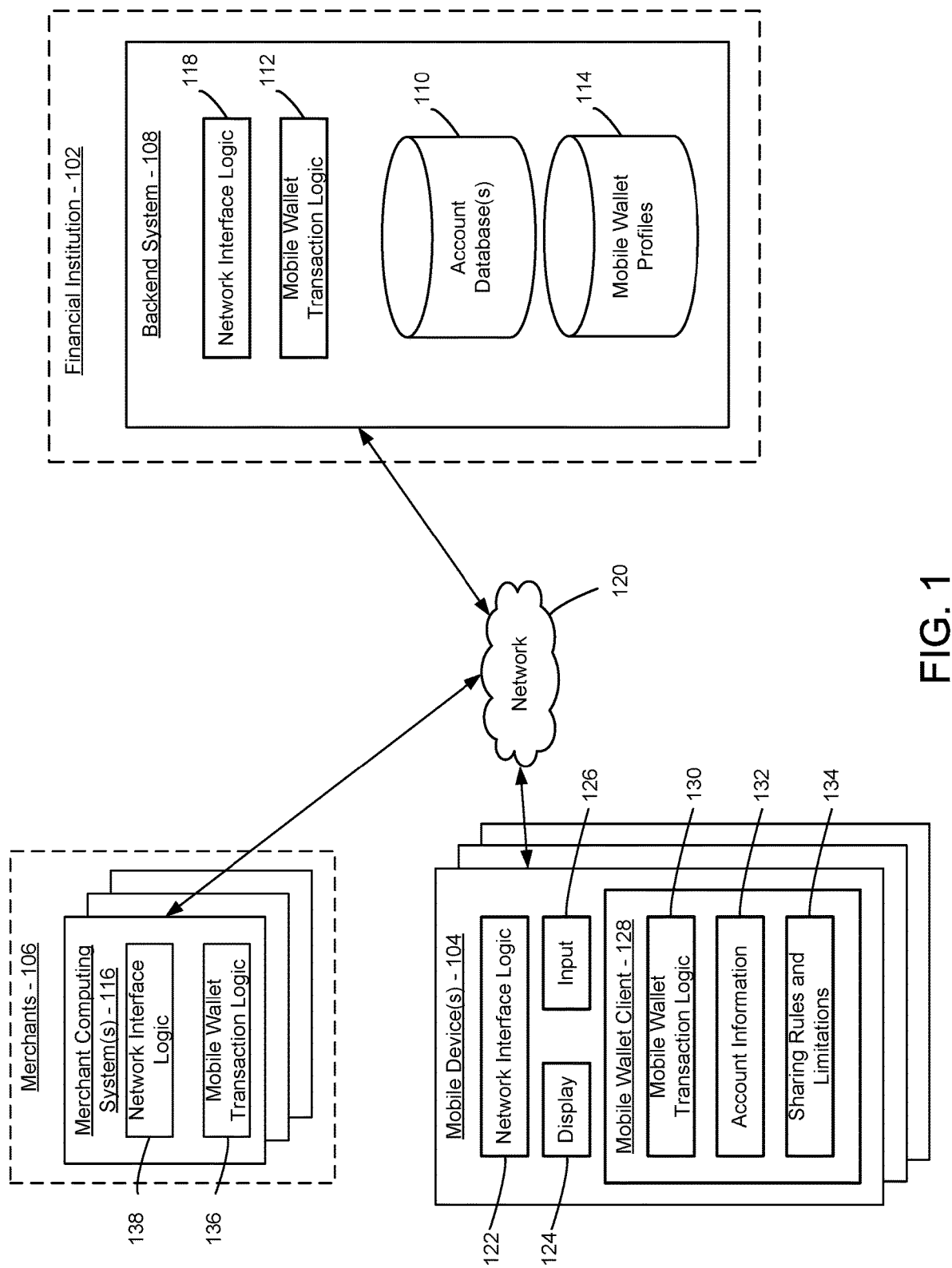
FIG. 1 is a schematic diagram of a computer-implemented mobile wallet payment system according to an exemplary embodiment.

Referring to FIG. 1, a schematic diagram of a computer-implemented mobile wallet payment system 100 is shown according to an exemplary embodiment. System 100 allows for users to facilitate transactions into and out of accounts associated with a financial institution 102 via mobile wallet accounts accessed on mobile devices 104. The users may be business entities and/or individual customers having one or more accounts with the financial institution 102. The accounts may include business or consumer demand deposit accounts (e.g., checking accounts, savings accounts, etc.) and credit accounts (credit cards, lines of credit, etc.). The mobile wallet account can be created for the user to transmit funds from an account with the financial institution 102 in return for the purchases of goods or services from various merchants 106. Additionally, funds can be transferred between accounts of different users (e.g., from a first mobile wallet to a second mobile wallet). In some arrangements, the system 100 integrates mobile wallet programs of multiple financial institutions. The relationships between the various devices and users of system 100 are described in further detail below.

The financial institution 102 includes a financial institution backend system 108. Although shown as a single computing device, the backend system 108 may be separated into a plurality of devices (e.g., a plurality of servers). The backend system 108 maintains various information relating to the accounts maintained with the financial institution 102 and the customers of the financial institution. The backend system 108 includes account databases 110. The account databases 110 are where the financial institution stores information relating to accounts, including account balance information and account owner information.

The backend system 108 includes components to provide the mobile wallet service to its customers. Accordingly, the backend system 108 includes mobile wallet transaction logic 112 and a mobile wallet profiles database 114. The mobile wallet profiles database 114 maintains a database of mobile wallet users and associations of the mobile wallet users with various accounts in the account databases 110. As described in further detail below, the mobile wallet profiles database 114 also maintains a listing of rules and limits (if any) for each mobile wallet user with respect to each account that mobile wallet user is associated with. The rules and limits can restrict secondary users' spending privileges with respect to any associated accounts. The mobile wallet transaction logic 112 interfaces with the mobile devices 104 and merchant computing systems 116 to perform mobile wallet transactions (as described in further detail below). The mobile wallet transaction logic 112 may include computer-readable instructions executed by a processor of the backend system 108 that cause the backend system 108 to operate in the manner described. The backend system 108 includes network interface logic 118 to help facilitate the mobile wallet transactions. The network interface logic 118 allows the backend system 108 to communicate with mobile devices 104 and merchant computing systems 116 via a network 120. In some arrangements, the network 120 is the internet.

Still referring to FIG. 1, the mobile device 104 may be used by an individual user (e.g., a business owner or employee, a consumer, and so on) to create and interact with a mobile wallet account with the financial institution 102. The mobile device 104 may, for example be, handheld computer, a cellular phone, smartphone, mobile handheld wireless e-mail device, a tablet computer, personal digital assistant, portable gaming devices, or another suitable device. The mobile device 104 comprises network interface logic 122, a display 124, an input 126, and a mobile wallet client application 128. In some arrangements, the display 124 and input 126 are integrated in a touchscreen display. Network interface logic 122 may include, for example, program logic that connects the mobile device 104 to the network 120. The mobile device 104 may receive and display user interfaces including account information, transaction instructions, and so on. In some arrangements, the user interfaces may be used to initiate payments from the user's mobile wallet to merchants 106. In other arrangements, the user interfaces may be used to provide secondary mobile wallet users access to the user's account, including setting up account rules and limitations. Such user interfaces are presented to the user via the display device 124. The input 126 may be used to permit the user to initiate account access and to facilitate receiving requested information from the user. As will be appreciated, in addition to or instead of the mobile device 104, users may also be provided with the ability to access the mobile wallet payment system 100 using another type of computer (e.g., a desktop or laptop computer executing browser software) to perform the operations described herein as being performed by the mobile device 104.

The mobile wallet client application 128 may comprise program logic executable by the mobile device to implement at least some or all of the functions described herein. As will be appreciated, the level of functionality that resides on the mobile device 104 as opposed to the financial institution backend system 108 may vary depending on the implementation. The client application 128 may be a web browser that is configured to receive and display mobile web pages (e.g., web pages prompting the user to provide information to create an account, web pages displaying account balance information and past transactions, and so on) or an application executed by the mobile device 104. The mobile wallet client application 128 may also include a code/token generator capable of generating a unique code/token for each transaction. The unique code/token may then be transmitted by the mobile device 104 as part of a transaction to facilitate authentication of the transaction and the user of the mobile device 104. As will be appreciated, the user may also use other devices (e.g., laptop or desktop computer system, not shown) to create and access the mobile wallet accounts.

In FIG. 1, the mobile wallet application 128 is used in connection with merchant computing systems 116 located at various physical store locations. As previously indicated, however, the mobile wallet application 128 may also be used in connection with online merchant transactions (e.g., an internet retailer). For example, in another embodiment, merchants 106 may be provided with the ability to have a mobile storefront and profile within the mobile wallet application 128. For example, merchants 106 may be provided with the ability to display marketing material, provide information, and promote products or discounts. Merchants 106 may also be provided with the ability to sell items directly through their mobile storefront for the account holder to purchase from within the mobile application 128.

The mobile wallet client application 128 may include, among other features, transaction logic 130, account information 132, and sharing rules and limitations 134. The transaction logic allows users of the mobile device 104 to provide funds to the merchants 106 in exchange for goods or services from an account with the financial institution 102 via the mobile wallet client application 128. This process is described in further detail in U.S. patent application Ser. No. 13/456,169, entitled "SYSTEM AND METHOD FOR A MOBILE WALLET," filed on Apr. 25, 2012, and U.S. patent application Ser. No. 13/456,157, entitled "SYSTEM AND METHOD FOR A MOBILE WALLET," filed on Apr. 25, 2012, which are hereby incorporated by reference in their entireties and for all purposes. The account information 132 stores associations between the user of the mobile device 104 and any accounts the user may own at the financial institution 102 or any accounts with the financial institution 102 that the user is a secondary user (e.g., an authorized user). The account information 132 is periodically updated based on information received from the backend system 108 (e.g., every minute, every ten minutes, every time the user logs into the mobile wallet client application 128, etc.). The sharing rules and limitations 134 include various rules and configurations available to the user when providing a secondary user access to the user's account via the mobile wallet client application 128.

Still referring to FIG. 1, the merchant computing systems 116 each include transaction logic 136 and network interface logic 138. Similar to mobile device 104, the transaction logic 136 allows merchants to accept mobile wallet payments from users of the mobile devices 104. The payments are account transfers from the financial institution into accounts associated with the merchants 116. The network interface logic 138 may include, for example, program logic that connects the merchant computing systems 116 to the network 120 to enable data communications between the merchant computing systems 116 and the mobile devices 104 and financial institution backend system 108.

As discussed above and as described in further detail below, the system 100 allows for a primary account holder to share an account with at least one secondary user. The secondary user is associated with the account. The secondary user's access rights (e.g., abilities to spend funds from the account at will) may be limited by certain rules and limitations levied by the primary account holder during initial configuration of the secondary user's access to the account. In an alternative arrangement, the primary account holder can fund a secondary wallet in the mobile wallet payment system 100 with the funds of the account. The secondary wallet is essentially a second account in the name of the secondary user. Although the first arrangement is described (the secondary user arrangement) for simplicity's sake, the described systems and methods can be applied to the second arrangement (the second account/wallet arrangement). Accordingly, in arrangements where a new second account is created instead of adding a second authorized user to an existing account, the second account can be subject to the same rules and limitations as the secondary user's access rights are subject to in the described arrangement.

Figure 2A:
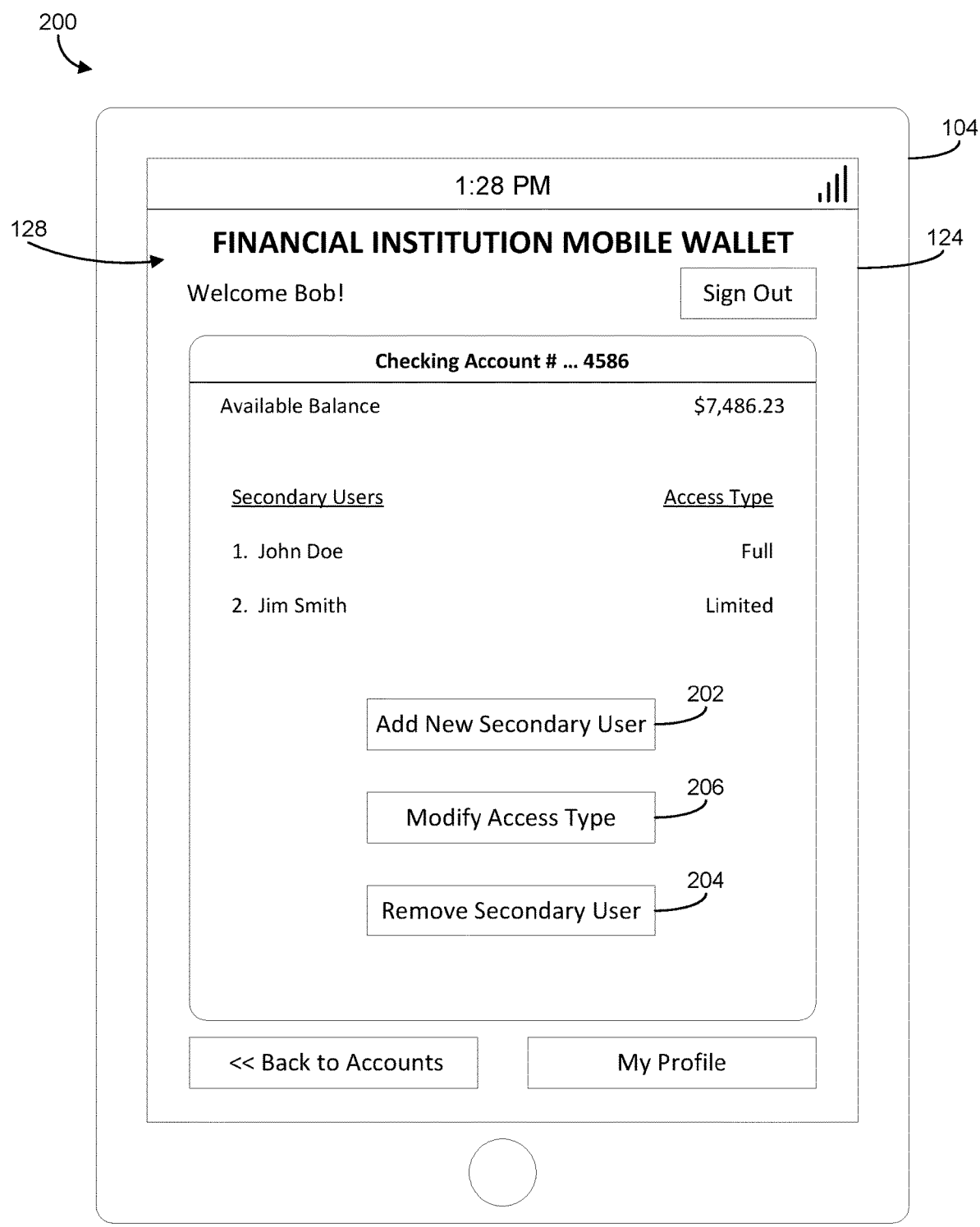
FIGS. 2A through 2C are exemplary user interfaces of the mobile wallet client application for the computer-implemented mobile wallet payment system of FIG. 1.
Figure 2B:
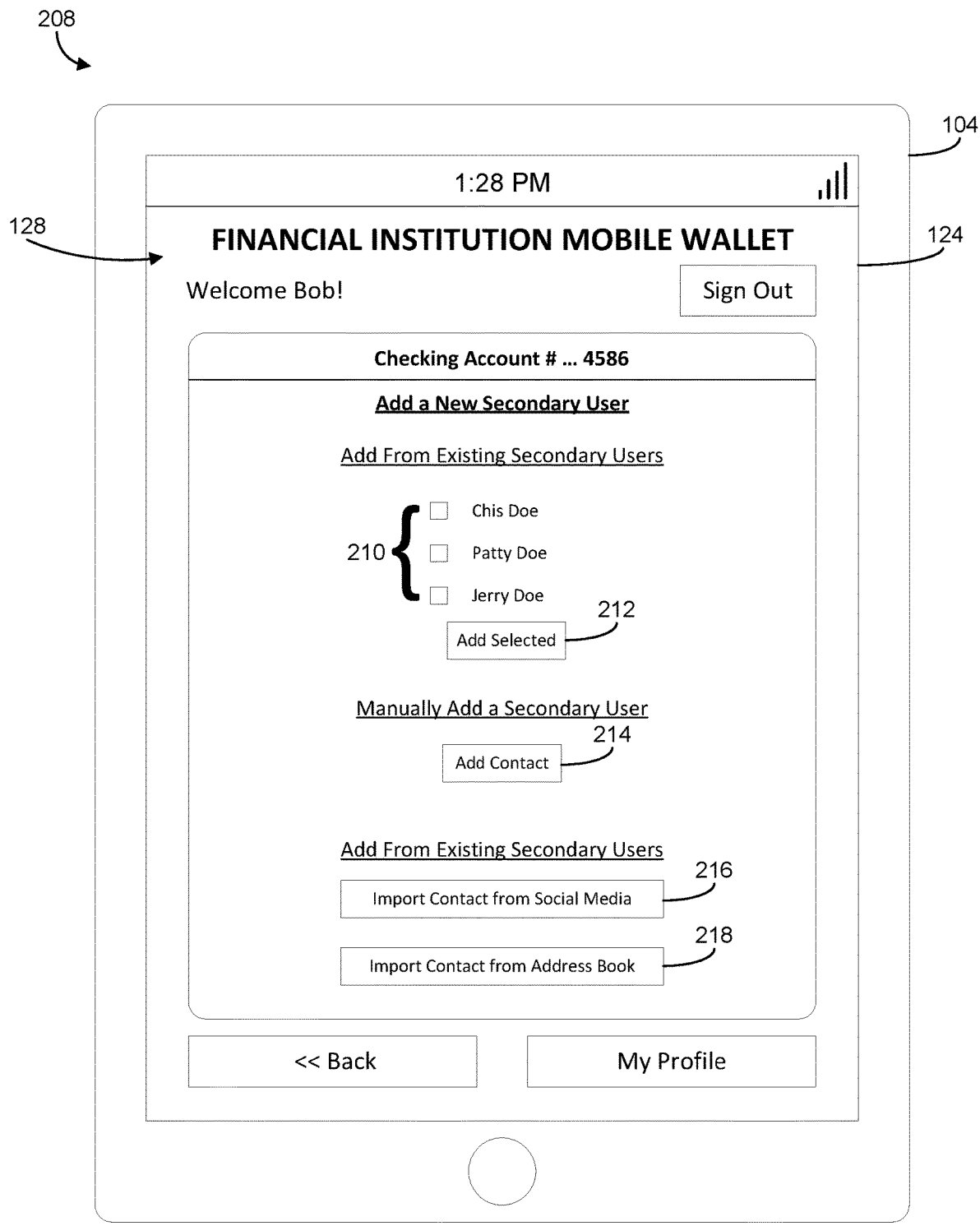
Figure 2C:
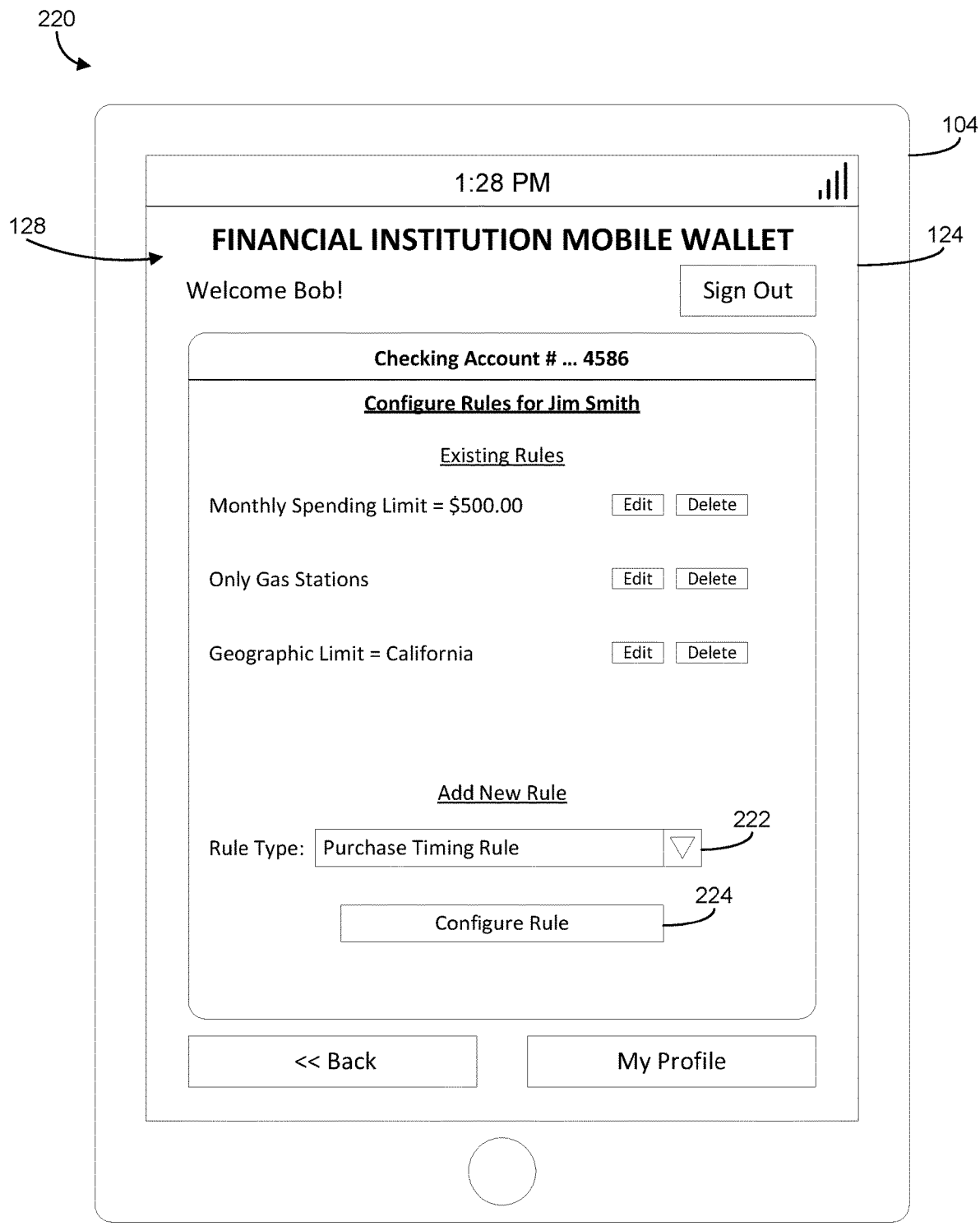

Referring to FIGS. 2A through 2C, exemplary user interfaces of the mobile wallet client application 128 as presented on the display 124 of the mobile device 104 are shown according to exemplary embodiments.

Referring to FIG. 2A, an account overview user interface 200 of the mobile wallet client application 128 is shown according to an exemplary embodiment. The user interface 200 relates to an overview of a user's account (shown as a checking account, but may be any type of account with the financial institution 102) as viewed from the user's mobile wallet client application 128. The user is the primary account holder of the checking account. The overview provides the user with general account information, such as account number or a portion there of, account balance, and any authorized secondary users of the checking account.

As described above and in further detail below, secondary users can use their personal mobile wallets to make purchases from the primary account holder's account. Accordingly, when a primary account holder adds a secondary user to the account, the primary account holder provides authorization for the secondary user to purchase goods and services with funds in the account via the secondary user's mobile wallet client application. To prevent or limit unauthorized spending by the secondary user, the primary account holder has the ability to place limits and rules on the secondary users. In the present example, Bob is the primary account holder and John Doe and Jim Smith are both authorized secondary users of the checking account. Accordingly, John Doe and Jim Smith can both access the funds of the checking account via their respective mobile wallets (as accessed via their respective mobile devices 104 and mobile wallet client applications 128). In the case of John Doe, John Doe has full access to the funds in the checking account (i.e., there are no rules or limits placed on John Doe's access to the checking account). In the case of Jim Smith, Jim Smith has limited access to the funds in the checking account (i.e., there are rules and/or limits placed on Jim Smith's access to the checking account). The arrangement of primary account holder and secondary users easily allows the primary account holder to provide funds to the secondary users. This may be beneficial in certain types of fiduciary relationships between people and entities. For example, the primary account holder may be a parent (or a set of parents) that authorizes their children as secondary users as a way of providing money to their children with restricted spending capabilities. As another example, the primary account holder may be an employer (e.g., a company) that authorizes their employees as the secondary users as a way of providing expense accounts with limited spending privileges. Other primary-secondary relationships are also contemplated, such as trustee-beneficiary relationships and child-elderly parent relationships. Still further, it is possible that two primary joint account holders (e.g., a married couple) can impose limits on each other with the described systems and methods. Additionally, it is possible for a primary account holder to self-impose limits on his spending out of an account as a way of budgeting.

Since the user is the primary account holder, the user has various account management options. In some arrangements, the account management options may also be available to secondary users having full access to the account. The user can add another secondary user by interacting with button 202 ("Add New Secondary User"). The user can remove an already existing secondary user, such as John Doe or Jim Smith, by interacting with button 204 ("Remove Secondary User"). The user can modify access type or level of an added secondary user by interacting with button 206 ("Modify Access Type").

Referring to FIG. 2B, a user interface 208 for adding a new secondary user to the account via the mobile wallet client application 128 is shown according to an exemplary embodiment. The primary account holder is directed to the user interface 208 after interacting with button 202 of user interface 200. The user interface 208 allows the primary account holder to add secondary users to the account. The secondary users can be added in multiple ways. A first way to add a secondary user is to add an existing secondary user. An existing secondary user is a user that was previously added by the primary account holder (e.g., on another account owned by the primary account holder, previously added and removed on the account, etc.). Accordingly, the backend system 108 stores information relating to the previously added secondary users by the primary account holder. To add a previously added secondary user as a new or current secondary user for the account, the primary account holder interacts with the check boxes 210 to select the secondary user to be added and then presses the button 212 ("Add Selected"). The selected user is then added as a secondary user. Another way to add a secondary user is to manually add a secondary user through manual input of the secondary user's information, such as the secondary user's name, address, phone number, date of birth, social security number, the mobile wallet username, or a combination thereof. To do so, the primary account holder presses button 214, and the mobile wallet client application 128 directs the primary account holder to the appropriate interface to manually add the secondary user. A further way to add a secondary user is to import a contact (i.e., a secondary user's information). For example, the secondary user's information may be imported from a social media account by pressing button 216. As another example, the secondary user's information may be imported from an address book (e.g., an address book specific to the mobile wallet client application 128, a contacts application of the mobile device 104, etc.) by pressing button 218. If the secondary user is not already registered with the financial institution 102 (i.e., the secondary user does not currently have a mobile wallet account), the backend system 108 can initiate a message, such as a text message or an e-mail message, instructing the added secondary user to download the mobile wallet client application 128 and to register with the financial institution 102. In some arrangements, the message includes a unique access code or invite code that allows the backend system 108 to recognize the secondary user during the secondary user's registration with the financial institution 102.

Referring to FIG. 2C, a user interface 220 for modifying an access type (e.g., setting up new rules and limits or removing existing rules and limits) for a secondary user via the mobile wallet client application 128 is shown according to an exemplary embodiment. The primary account holder is directed to the user interface 220 by interacting with button 206 of user interface 200. Through the user interface 220, the primary account holder can limit a secondary user's access to the funds in the account by providing spending rules and limits for each secondary user. As shown in FIG. 2C, Jim Smith has limited access to the primary account holder's account. Specifically, Jim Smith is limited to spending $500 a month out of the account and is limited to only purchases at gas stations within California. Any one of the three rules can be edited (e.g., changed from California to California and Nevada, spending limit increased or decreased, etc.) or deleted via the user interface 220. Additionally, new rules can be added. The primary account holder can select a rule type through a dropdown menu 222 and configure the selected rule type on another user interface by interacting with button 224 ("Configure Rule"). A plurality of rule and limit types are available to the primary account holder. The rule and limit types include spending limits, types of goods and services restrictions, store specific restrictions, purpose of purchase rules, purchase timing rules, geographic restrictions, group purchase rules. Each rule and limitation restricts how a secondary user can spend the funds in the primary account holder's account. Each rule or limit type is described in further detail below.

Spending Limits

One type of rule or limit the primary account holder can impose on secondary users is a spending limit. The spending limit provides for a maximum amount of money the secondary user is allowed to spend from the primary account holder's account. In some arrangements, the spending limit may be on a per purchase basis. For example, the primary account holder can limit a given secondary user to purchases of $50, in which case the secondary user can make as many purchases as he wants, as long as each purchase less than or equal to $50. If the secondary user attempts to make a purchase for $75, the mobile wallet client application will not allow the purchase to go through because the $75 purchase exceeds the $50 limit set by the primary account holder. In other arrangements, the spending limit is a cumulative spending limit. For example, the primary account holder can limit the total spending of a second user to $500, in which case the secondary user can make a plurality of purchases as long as the total of the purchases remains under $500. If the secondary user has already made ten purchases totaling $450 and the secondary user tries to make an eleventh purchase for $75, the mobile wallet client application will not allow the purchase to go through because the $75 purchase will cause the total to exceed the $500 limit. The cumulative spending limit may reset after a given period of time. The given period of time can be a number of minutes, a number of hours, a number of days, a number of weeks, a number of months, etc. For example, the above mentioned $500 cumulative spending limit may reset every month such that the secondary user can spend up to $500 a month from the primary account holder's account (e.g., as shown FIG. 2C). This type of cumulative spending limit that resets after a given period of time may be good for parents (primary account holders) providing allowances to their children (secondary users), employers (primary account holders) providing spending accounts to their employees (secondary users), and the like. As another example, the cumulative spending limit may reset responsive to inputs received from the primary account holder. For example, the secondary user may be permitted to spend $500 at a time. After that, the secondary user may no longer spend funds, until the primary user authorizes another $500 in spending.

Types of Goods and Services Restrictions

Another type of rule or limit the primary account holder can impose on secondary users are restrictions on the types of goods and services the secondary user can purchase. The restrictions on the types of goods and services may be implemented in different ways. A first way is for the primary account holder to indicate acceptable types of goods and services for the secondary users to purchase. The acceptable types of goods and services may be a specific good or service or a category of goods and services. For example, an employer (primary account holder) may be in the delivery business and provide his employee delivery drivers (secondary users) access to a spending account via the mobile wallet client application. The employer may limit the employees' spending to specific goods, such as gasoline, to specific types of goods, such as automotive related goods and services, or to a combination thereof. Such a rule prevents (or at least limits) an employee's or secondary user's potential abuse of the spending privileges. A second way is for the primary account holder to indicate non-acceptable types of goods and services for the secondary users to purchase. The non-acceptable types of goods and services may be a specific good or service or a category of goods and services. For example, a parent (primary account holder) may provide access to the account to his child (secondary user). However, the parent may impose a rule that the child cannot spend money from the account for specific goods, such as Budweiser, for types of goods, such as alcohol, or for a combination thereof. Such a rule prevents the secondary user from purchasing specific goods or services or specific types of goods and services via the mobile wallet client application.

In some arrangements, the merchants 106 may not provide specific product information with purchase requests. Often, merchants 106 view this information as a trade secret and a valuable customer metric tool. In these situations, the financial institution 102 can partner with certain merchants 106 to share this information to allow types of goods and services restrictions to be implemented. The merchants 106 opting in to the program may be advertised as preferred merchants by the financial institution 102 in exchange for their participation. Further, the merchants 106 can be listed as exclusive store options for the store specific restrictions (as discussed in further detail below).

Store Specific Restrictions

Another type of rule or limit the primary account holder can impose on secondary users is restrictions on the stores that the secondary users can purchase goods and services with funds from the account. When used in reference to store specific restrictions (and not with respect to data storage), "stores" refers to retailers, service providers, restaurants, bars, clubs, marketplaces, or any other company or individual where a user can purchase goods or services. Similar to the restrictions on the types of goods and services, the restrictions on the stores can work two different ways. A first way is for the primary account holder to indicate acceptable stores or store types for the secondary users. The acceptable stores may include specific branded stores (e.g., Shell, BP, etc.) or may include specific types of stores (e.g., gas stations). For example, an employer (primary account holder) may be in the delivery business and provide his employee delivery drivers (secondary users) access to a spending account via the mobile wallet client application. The employer may limit the employees' spending to specific stores, such as Shell and BP gas stations, to specific types of stores, such as gas stations, or to a combination thereof. A second way is for the primary account holder to indicate non-acceptable stores and store types for the secondary users. For example, a parent (primary account holder) may provide access to the account to his child (secondary user). However, the parent may impose a rule that the child cannot spend money at a specific store, such as John's Bar and Tap, for types of store, such as liquor stores and bars, or a combination thereof.

Purpose of Purchase Rules

Yet another type of rule or limit the primary account holder can impose on secondary users are restrictions of purchases by the secondary users from the account based on the purpose of the purchase. In some arrangements, the primary account holder can request that the secondary user provide a purpose for each purpose prior to the purchase being authorized by the mobile wallet client application. Similar to the restrictions on the types of goods and services and the types of stores, the restrictions based on the purposes of the purchase can work two different ways. A first way is for the primary account holder to indicate acceptable purchase purposes. For example, an employer (primary account holder) may be in the delivery business and provide his employee delivery drivers (secondary users) access to a spending account via the mobile wallet client application. The employer may limit the employees' spending to purchases for refueling purposes. A second way is for the primary account holder to indicate non-acceptable purchase purposes. For example, a parent (primary account holder) may provide access to the account to his child (secondary user). However, the parent may impose a rule that the child cannot spend money for social events.

Purchase Timing Rules

A further rule or type of limit the primary account holder can impose on secondary users is restrictions on the timing of purchases made by the secondary users. The timing restriction may relate to allowing or prohibiting purchases during designated time periods. The designated time period may be a time range (e.g., from 12 am through 7 am), a day of the week, a month of the year, holidays, or a combination thereof. For example, an employer (primary account holder) may prohibit employees (secondary users) from making purchases during non-business hours (e.g., no purchases allowed all day Saturday and Sunday and between the hours of 5:01 pm through 8:59 am Mondays through Fridays).

Geographic Restrictions

Another type of limit the primary account holder can impose on secondary users are restrictions of purchases based on the location of the secondary user. The geographic restriction may relate to either allowing or prohibiting purchases based on the secondary user's detected location. The primary account holder defines a specific geographic zone where purchases are either allowed or prohibited defines. The geographic zone may relate to a radius from a specific geographic point (e.g., a radius of five miles from a particular address), within a designated city or township limit, within a county, within a state, within a country, and so on. For example, an employer (primary account holder) may be in the delivery business and provide his employee delivery drivers (secondary users) access to a spending account via the mobile wallet client application. The employer may limit the employees' spending to purchases made within the company's delivery zone (e.g., a thirty mile radius from the company's dispatch warehouse, a city, a state, etc.). Such a limit prevents employee spending for tasks not related to their jobs.

Group Purchase Rules

Yet another type of rule or limit the primary account holder can impose on secondary users is restrictions based on the secondary user being with (e.g., near or in proximity to) a prohibited person at the time of a purchase attempt. The primary account holder can program rules that prevent purchases when secondary users are in proximity (e.g., within a set distance, such as 100 feet,) to certain identified individuals. A group purchase rule may help parents (primary account users) prevent their children (secondary users) from associating with certain individuals. Accordingly, prior to allowing a purchase by a secondary user, the system 100 first determines whether the secondary user is near any identified prohibited individuals. The system 100 may locate the identified prohibited individuals based on known locations of mobile devices associated with the prohibited individuals that are running the mobile wallet client application, based on scanning social media activity of the secondary user (e.g., for recent posts indicating that the secondary user is with a prohibited individual), based on locating the secondary user and prohibited users (e.g., via Bluetooth Low Energy location beacons, via a peer-to-peer chat client, via comparisons of WiFi SSIDs, etc.) or by another suitable method. For example, if the prohibited individual is a registered user of the financial institution 102 and the prohibited individual's mobile device 104 is running the mobile wallet client application 128, the backend system 108 can track the location of the prohibited individual and compare it with the location of the secondary user's purchase. As another example, some social media applications allow users to locate friends or contacts that are nearby. The mobile wallet application client 128 can interface with the social media application and compare the listing of nearby friends with the listing of prohibited individuals. If the secondary user is near a prohibited individual, the transaction is not allowed. Further, the group purchase rule can also add a timing aspect. For example, if the secondary user was near a prohibited individual within a certain time period (e.g., two hours), the transaction can still be rejected. Such an arrangement prevents the prohibited individual and secondary user from tricking the system 100 by either walking away from the secondary user or shutting off his mobile device at the time of the purchase to allow the purchase to continue.

The above described rule types can be combined to form complex spending limitations for secondary users. For example, with respect to the employer (primary account holder) and employee (secondary user) examples provided above, the employer may implement a spending limit, a timing restriction, and a restriction on the types of goods that employees can purchase via the mobile wallet client application. An exemplary combined rule might indicate that the employee is only allowed to spend up to $500 a week on gasoline on Mondays through Fridays between the hours of 8 am and 6 pm.

The above described rules are applied on a secondary user by secondary users basis. Accordingly, all secondary users associated with a single account do not necessarily have the same set of rules and limitations. As shown in FIG. 2A, both John Doe and Jim Smith are secondary users of the same primary account holder's account, and each of John Doe and Jim Smith have a different level of access.

Figure 3:
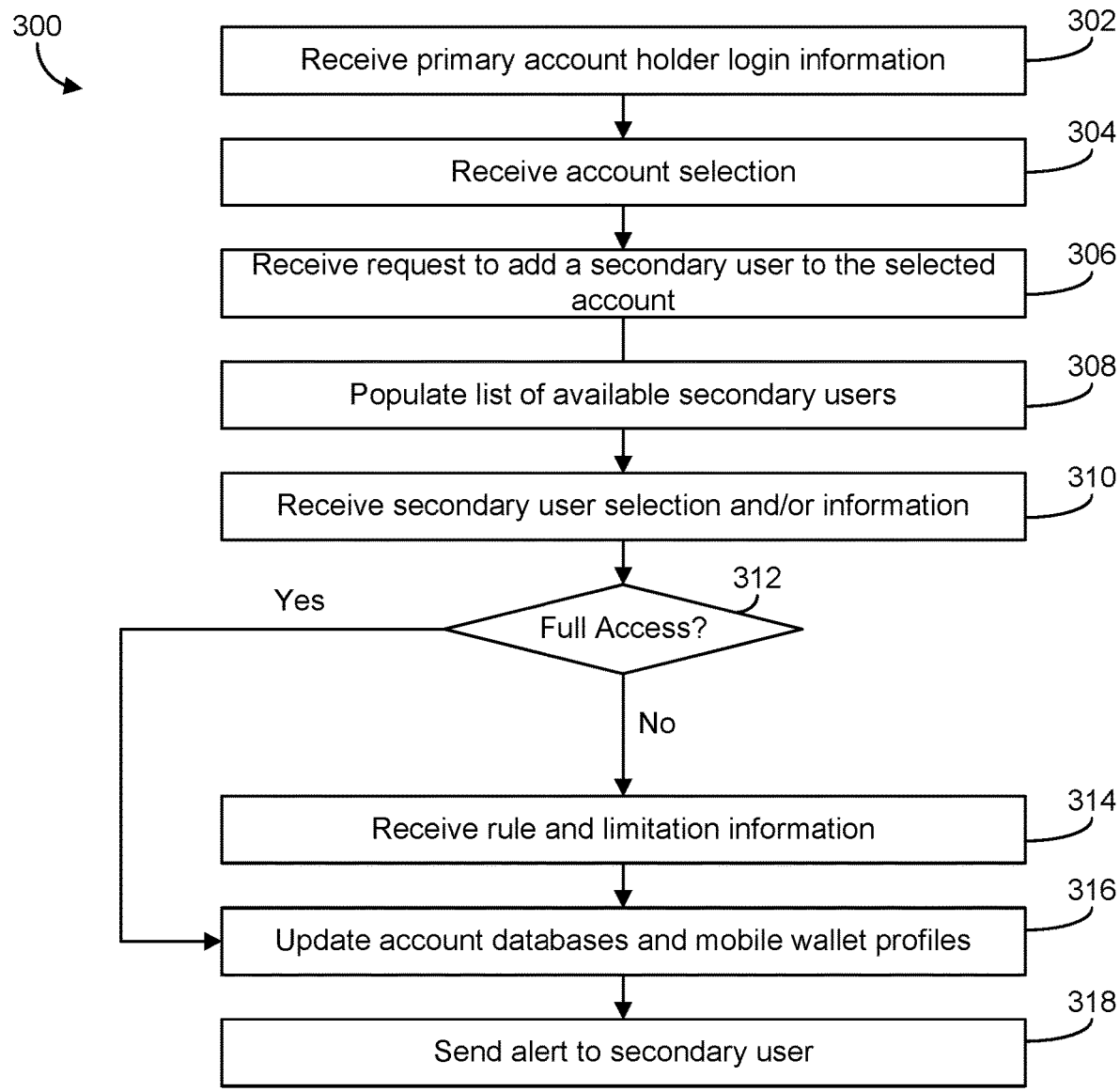
FIG. 3 is a flow diagram of a method of adding a secondary user to an account according to an exemplary embodiment.

Referring to FIG. 3, a flow diagram of a method 300 of adding a secondary user to an account is shown according to an exemplary embodiment. The method 300 is performed by a backend system (e.g., backend system 108) of a financial institution (e.g., financial institution 102). The backend system provides and maintains a mobile wallet system (e.g., system 100) in which customers of the financial institution can initiate transactions between other customers or merchants via a mobile wallet application (e.g., mobile wallet client application 128) running on the customers' computing devices (e.g., mobile device 104). As discussed above and as described in further detail below, primary account holders can provide access to an account to secondary users through the mobile wallet application. The access can be full access (e.g., having the same set of spending privileges as those of the primary account holder) or limited access (e.g., the secondary user's purchases are subject to certain restrictions, rules, and limits).

Method 300 begins when primary account holder login information is received (302). The primary account holder login information is received by the backend system from a user's computing device (such as a mobile device). The receipt of the primary account holder login information signals to the backend system that the primary account holder is attempting to access his accounts through a financial institution application (e.g., mobile wallet client application 128). The primary account holder login information is verified by the backend system prior to providing the primary account holder access to his accounts via the computing device. After the primary account holder login information is verified, the user of the computing device is authenticated as the primary account holder, and the user is provided access to the primary account holder's accounts. Access to the accounts allows the user to view account information for each of the accounts (e.g., balance information, transaction information, etc.), perform transactions via the primary account holder's mobile wallet, add secondary users to specific accounts, assign limits and rules to secondary users on accounts, and the like.

After the primary account holder has logged into his accounts, an account selection is received (304). The account selection is received by the backend system from the computing device. The account selection relates to a selection by the primary account holder of an account from a listing of accounts. For example, after logging into the financial institution application, the primary account holder is presented with a listing of accounts, such as a checking account, a savings account, a credit card account, and any other accounts the primary account holder is a holder of or a secondary user of. The primary account holder can select one of the accounts to view more information (e.g., to view recent transactions, account balances, statements, etc.). Upon selection of the account, the primary account holder is directed to an account detail user interface showing a detailed account summary for the selected account (e.g., as shown in FIG. 2A). Through the account detail user interface, the primary account holder can add secondary users to the account, remove already added secondary users to the account, and modify an access level of secondary users to the account (e.g., restrict access to the account's funds or lift restrictions already in place).

A request to add a secondary user to the selected account is received (306). The request is received by the backend system from the computing device. The request indicates that the primary account holder wants to add a secondary user to the selected account. In some arrangements, the request is initiated from the computing device by the primary account holder interacting with the user interface (e.g., by selecting button 202 of user interface 200).

A list of available secondary users is populated (308). The available secondary users are sent from the backend system to the computing device for population on the user interface of the computing device (e.g., as shown in user interface 208 of FIG. 2B). The available secondary users includes any secondary users previously authorized by the primary account holder. For example, if the primary account holder is a parent, the parent may have previously configured his children as secondary users for other accounts. Accordingly, each child may be listed in the list. Additional possible secondary users may be pulled from a contact or address book of the primary account holder stored on the computing device. For example, the financial institution application may include a contacts list or a buddy list that may be used to populate the list of available secondary users. In some arrangements, the list includes the option to add a new secondary user not already listed. If this option is selected by the primary account holder, the primary account holder may be prompted to provide information relating to the secondary user, such as the secondary user's name, address, phone number date of birth, social security number, the mobile wallet username, or a combination thereof. In further arrangements, the primary account holder can provide the mobile phone number of the secondary user. If the secondary user is already a known user (i.e., the secondary user already has an account at the financial institution and their mobile phone number is registered), then they are just added. If the mobile phone number is unrecognized, then the backend system can initiate a text message to the secondary user with a link to download the mobile wallet app.

A secondary user selection and/or information about the secondary user is received (310). The secondary user selection and/or information is received at the backend system from the computing device. As discussed above, the primary account holder can select a secondary user for adding to the account by interaction with the populated list of the user interface. Additionally or alternatively, the primary account holder can provide secondary user information if the desired secondary user is not populated in the list. The secondary user information may relate to the secondary user's name, address, phone number date of birth, social security number, mobile wallet username, or a combination thereof.

The primary account holder can arrange for the secondary user to have full access to the account or limited access to the account (312). If the primary account holder provides limited access to the account, rule and limitation information is received (314). The rule and limitation information is received at the backend system from the computing device. The primary account holder configures rules and limitations for the secondary user that limit the spending of the secondary user from the account (e.g., by interacting with user interface 220 of FIG. 2C). As described above, the rules and limitations set by the primary account holder may relate to spending limits, types of goods and services restrictions, store specific restrictions, purpose of purchase rules, purchase timing rules, geographic restrictions, group purchase rules, or a combination thereof. The received rule and limitation information relates to at least one rule or limitation that restricts the secondary user's ability to spend funds from the account.

After the rule and limitation information is received or if the primary account holder provides full access to the account, the account databases and mobile wallet profiles are updated (316). The backend system stores the association in account databases (e.g., account databases 110) and a database of mobile wallet profiles (e.g., mobile wallet profiles database 114). These databases may be hosted locally by the backend system. After the databases are updated, the secondary user is considered added to the selected account of the primary account holder. Accordingly, the secondary user is allowed to pay for authorized purchases (i.e., purchases falling within the secondary user's purchasing power as defined by the rules and limitations set by the primary account holder) via the secondary user's mobile wallet (e.g., the mobile wallet client application running on the secondary user's mobile device).

An alert is sent to the secondary user (318). The alert is sent by the backend system to a computing device of the secondary user. The alert may be an e-mail message, a text message, an in app notification (e.g., a push notification), or a combination thereof. The alert includes an indication that the secondary user has been added to the account. In some arrangements, the alert also includes an indication of the rules and limitations imposed by the primary account holder on the secondary user's spending.

After the secondary user is added and the initial rules and limits are established, the primary account holder can later modify the rules and limitations for each secondary user. This may be achieved by the primary account holder selecting the existing secondary user via the user interface and selecting an option to add or modify rules and limitations associated with the selected secondary user (e.g., by interacting with user interface 220 of FIG. 2C). The user's computing device transmits the selection to the backend system, where it is received. The backend system then performs 314-318 as described above to update the rules and limitations for the selected secondary user.

Figure 4:
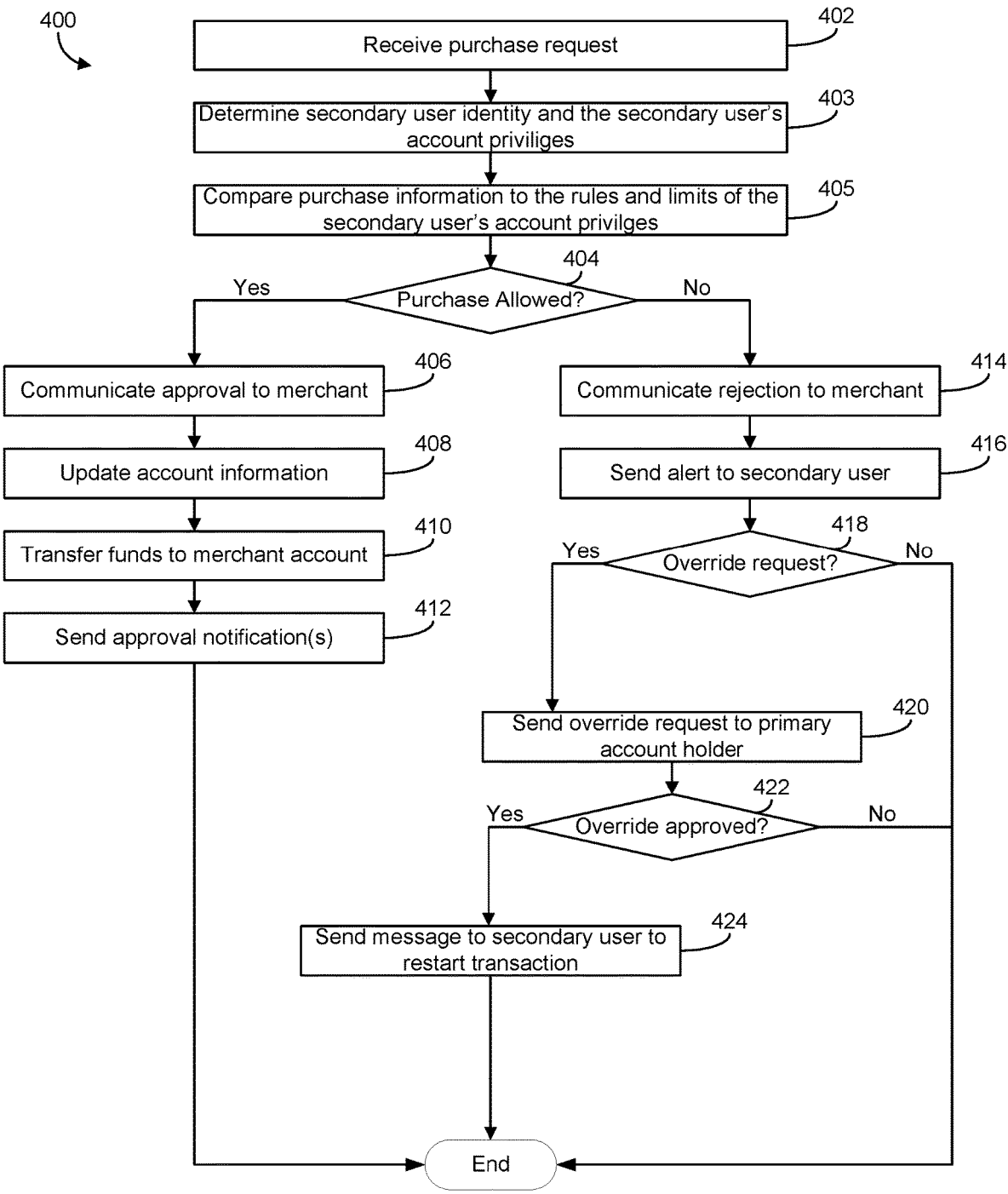
FIG. 4 is a flow diagram of a method of processing a purchase request by a secondary user of an account via a mobile wallet system according to an exemplary embodiment.

Referring to FIG. 4, a flow diagram of a method 400 of processing a purchase request by a secondary user of an account via a mobile wallet system (e.g., system 100) is shown according to an exemplary embodiment. Method 400 occurs after method 300 is completed (e.g., after a secondary user is added to a primary account holder's account). Method 400 is may be repeated for each of a plurality of transactions occurring after the secondary user is added through method 300. Method 400 is performed in the same computing system as described above with respect to method 300. Accordingly, method 400 is performed by a backend system (e.g., backend system 108) of a financial institution (e.g., financial institution 102). The backend system provides and maintains a mobile wallet system (e.g., system 100) in which customers of the financial institution can initiate transactions between other customers or merchants via a mobile wallet application (e.g., mobile wallet client application 128) running on the customers' computing devices (e.g., mobile devices 104). As described above in method 300, users of the mobile wallet system can be secondary users of accounts owned by primary account holders. The secondary users may have a limited or restricted spending power with respect to the accounts owned by the primary account holders.

Method 400 begins when a purchase request is received (402). The purchase request is a mobile wallet purchase request. The purchase request is received at the backend system from a merchant computing system (e.g., merchant computing system 116). The merchant computing system 116 may be a point of sale system. In other arrangements, the merchant computing system 116 may be a merchant backend system for an internet retailer. The purchase request includes, among other purchase information, an identification of the merchant, an identification of the person attempting to make the purchase (e.g., in the present case, the person is the secondary user), an identification of the account (e.g., in the present case, the account is the account owned by the primary account holder), and a cost of the purchase. In some arrangements, the purchase request also includes an itemized list of what goods or services are attempted to be purchased.

The secondary user identity and the secondary user's associated account privileges are determined (403). Based on the information contained in the purchase request, the backend system identifies the secondary user and compares the secondary user's identity to ensure the secondary user is an authorized user of the account. If the secondary user is not an authorized user, the backend system may notify the primary account holder of the attempted fraudulent transaction and method 400 ends. If, as in the above described situation, the secondary user is an authorized user of the account, the secondary user's account privileges are determined. The account privileges relate to any rules and limitations that apply to the secondary user's use of the account.

The purchase information of the purchase request is compared to the identified rules and limitations associated with the secondary user (405). The rules and limitations set by the primary account holder may relate to spending limits, types of goods and services restrictions, store specific restrictions, purpose of purchase rules, purchase timing rules, geographic restrictions, group purchase rules, or a combination thereof. Each of these rules and limitations are explained above in further detail. If the purchase falls outside of the boundaries of one of the rules or limitations, the purchase will be rejected by the financial institution. For example, if one of the limitations relates to a spending limit of $100 and the purchase is for $150, the financial institution will reject the purchase request because the secondary user is not authorized to make the purchase based on the limit set by the primary account holder. As noted above, in some arrangements, there are no rules or limitations associated with the secondary user because the secondary user has full access to the account. In such arrangements, 405 is skipped.

The backend system determines if the purchase is allowed (404). The backend system transmits a purchase authorization decision to the merchant computing system based at least in part on the determination of 404. If the purchase is determined to be allowable at 404 (e.g., the purchase is in compliance with the rules and limitations), an approval is communicated to the merchant (406). The approval signals to the merchant that the purchase is allowed. The backend system updates account information (e.g., balance information) to account for cost of the purchase (408). The financial institution transfers funds to the merchant account (410) to pay for the purchase. The funds may be transferred to another account within the financial institution (if the merchant is an account holder), to another financial institution, or to a third party. Optionally, approval notifications are sent (412). An approval notification may be sent by the backend system to the secondary user (e.g., via an alert within the mobile wallet application). An approval notification may be sent to the primary account holder in a similar manner. The approval notifications may include information about the purchase.

If the purchase is determined to be not allowable at 404 (e.g., the purchase is not in compliance with the rules and limitations), a rejection is communicated to the merchant (414). The rejection signals to the merchant that the purchase is not allowed such that the purchase is not completed by the merchant. In response to the rejection, an alert is sent to the secondary user (416). The alert is sent by the backend system to the secondary user's computing device. The alert may include an indication as to why the purchase is not allowed (e.g., an indication as to what rule would be broken or what limit would be exceeded if the purchase was approved). For example, the alert may say "Transaction not approved—exceeds spending limit." As another example, the alert may say "Transaction not approved—non-approved store." An additional alert may be sent to the primary account holder's computing device indicating that the secondary user attempted to make a non-approved purchase.

In some arrangements, the alert to the secondary user may include an option to request an override for the particular transaction. For example, the alert may say "Transaction not approved—exceeds spending limit. Press here to request an override." Accordingly, the backend system determines if it received an override request (418). If an override request was not received, method 400 ends. If an override request is received by the backend system from the secondary user's computing device, the backend system sends an override request to the primary account holder (420). The message may be sent to the primary account holder's computing device, such as a mobile phone. The message may be an e-mail message, a text message, an in app notification (e.g., a push notification), or a combination thereof. The message includes information about the previously rejected purchase. The information may include the identity of the secondary user, the amount of the purchase, the identity of the merchant, and other relevant purchase information. The message requests the user to either approve or reject the proposed transaction. The primary account holder can interact with the message to either provide an approval or to maintain the rejection.

The backend system determines if the override is approved (422). If the override request is not approved, method 400 ends. In some arrangements, the override request may automatically be assumed to not be approved if a certain period of time elapses from the time of the request without a response from the primary account holder. If the override request is not approved, the backend system may initiate an alert to the secondary user's computing device indicating that the override was denied. If the override request is approved, the backend system sends a message to the secondary user's computing device instructing the secondary user to restart the transaction (424). The backend system may annotate the mobile wallet profile of the secondary user or the account database with the one-time exception. Accordingly, if the secondary user reattempts the transaction, the transaction will be deemed allowable at 404. In some arrangements, the one-time exception expires after a designated period of time (e.g., an hour). In some situations, a secondary user can preemptively request an override if the secondary user anticipates needing to make a purchase that will not be authorized under the ordinary rules. In such situations, method 400 can begin at 418. Further the override process may take the appearance of a negotiation with at least one counter offer exchanged between the primary account holder and the secondary user after the initial override request.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
receiving, by a processor of a financial institution device from a first instance of a mobile wallet application deployed to a customer computing device associated with a primary account holder, a request to add a secondary user to an account of the primary account holder;
receiving, by the processor and from the customer computing device, information relating to the secondary user;
receiving, by the processor and from the customer computing device, rule and limitation information relating to at least one rule or limitation that restricts the secondary user's ability to spend funds from the account;
updating, by the processor, at least one database based on the information relating to the secondary user and the rule and limitation information;
based on the information relating to the secondary user, generating, by the processor, an electronic message comprising a link structured to allow the secondary user to download, at a secondary user computing device, a second instance of the mobile wallet application, wherein the second instance of the mobile wallet application is structured to gather location data from at least one of a Bluetooth device interfacing with the secondary user computing device, a WiFi device interfacing with the secondary computing device, and an application provided to the secondary computing device, and wherein the location data is used to allow a purchase transaction based on a determination that the secondary computing device is within a threshold distance from a third computing device;
based on the information relating to the secondary user, transmitting the electronic message to the secondary user computing device.

2. The method of claim 1, further comprising sending, by the processor and through a network interface of the financial institution device, an alert to the secondary user computing device, the alert including an indication that the secondary user has been added to the account.

3. The method of claim 1, further comprising receiving, by the processor and from the customer computing device, a selection of the account from a listing of accounts associated with the primary account holder.

4. The method of claim 1, wherein the at least one rule or limitation is selected from the following rules and limitations: a spending limit, a types of goods and services restriction, a store specific restriction, a purpose of purchase rule, a purchase timing rule, a geographic restriction, and group purchase rule.

5. The method of claim 1, further comprising processing a purchase request by the secondary user with funds from the account.

6. The method of claim 5, wherein the processing of the purchase request includes:
receiving, by the processor and from a merchant computing system, a purchase request, the purchase request including purchase information;
comparing, by the processor, the purchase information with the at least one rule or limitation; and
transmitting, by the processor, a purchase authorization decision based at least in part on the comparison of the purchase information with the at least one rule or limitation.

7. The method of claim 6, further comprising determining that the purchase information is in compliance with the at least one rule or limitation, and wherein the purchase authorization decision is an approval.

8. The method of claim 6, further comprising determining that the purchase information is not in compliance with the at least one rule or limitation, and wherein the purchase authorization decision is a rejection.

9. A financial institution computing system, comprising:
an account database;
a mobile wallet profile database;
a network interface; and
a processor configured to:
receive a request to add a secondary user to an account of the primary account holder from a first instance of a mobile wallet application deployed to a customer computing device associated with a primary account holder, receive information relating to the secondary user, receive rule and limitation information relating to at least one rule or limitation that restricts the secondary user's ability to spend funds from the account, update at least one database based on the information relating to the secondary user and the rule and limitation information, based on the information relating to the secondary user, generate, by the processor, an electronic message comprising a link structured to allow the secondary user to download, at a secondary user computing device, a second instance of the mobile wallet application, wherein the second instance of the mobile wallet application is structured to gather location data from at least one of a Bluetooth device interfacing with the secondary user computing device, a WiFi device interfacing with the secondary computing device, and an application provided to the secondary computing device, and wherein the location data is used to allow a purchase transaction based on a determination that the secondary computing device is within a threshold distance from a third computing device;

based on the information relating to the secondary user, transmitting the electronic message to the secondary user computing device.

10. The system of claim 9, wherein the processor is further configured to send an alert to the secondary user computing device, the alert including an indication that the secondary user has been added to the account.

11. The system of claim 9, wherein the processor is further configured to receive a selection of the account from a listing of accounts associated with the primary account holder.

12. The system of claim 9, wherein the at least one rule or limitation is selected from the following rules and limitations: a spending limit, a types of goods and services restriction, a store specific restriction, a purpose of purchase rule, a purchase timing rule, a geographic restriction, and group purchase rule.

13. The system of claim 9, wherein the processor is further configured to process a purchase request by the secondary user with funds from the account.

14. The system of claim 13, wherein the processing of the purchase request includes:

receiving, by the processor and from a merchant computing system, a purchase request, the purchase request including purchase information;

comparing, by the processor, the purchase information with the at least one rule or limitation; and transmitting, by the processor, a purchase authorization decision based at least in part on the comparison of the purchase information with the at least one rule or limitation.

15. The system of claim 14, wherein the processor is further configured to determine that the purchase information is in compliance with the at least one rule or limitation, and wherein the purchase authorization decision is an approval.

16. The system of claim 14, wherein the processor is further configured to determine that the purchase information is not in compliance with the at least one rule or limitation, and wherein the purchase authorization decision is a rejection.

17. A non-transitory computer readable media having computer-executable instructions embodied therein that, when executed by a processor of a financial institution computing system, cause the financial institution computing system to perform operations to restrict a primary user's access to an account owned by a primary account holder, the operations comprising:

receive a request to add the secondary user to the account of the primary account holder from a first instance of a mobile wallet application deployed to a customer computing device associated with a primary account holder;

receive information relating to the secondary user;

receive rule and limitation information relating to at least one rule or limitation that restricts the secondary user's ability to spend funds from the account;

update at least one database based on the information relating to the secondary user and the rule and limitation information, based on the information relating to the secondary user, generating, by the processor, an electronic message comprising a link structured to allow the secondary user to download, at a secondary user computing device, a second instance of the mobile wallet application, wherein the second instance of the mobile wallet application is structured to gather location data from at least one of a Bluetooth device interfacing with the secondary user computing device, a WiFi device interfacing with the secondary computing device, and an application provided to the secondary computing device, and wherein the location data is used to allow a purchase transaction based on a determination that the secondary computing device is within a threshold distance from a third computing device;

based on the information relating to the secondary user, transmitting the electronic message to the secondary user computing device.

18. The media of claim 17, wherein the operations further comprise send, through a network interface of the financial institution device, an alert to the secondary user computing device, the alert including an indication that the secondary user has been added to the account.

19. The media of claim 17, wherein the operations further comprise receive, from the customer computing device, a selection of the account from a listing of accounts associated with the primary account holder.

20. The media of claim 17, wherein the at least one rule or limitation is selected from the following rules and limitations: a spending limit, a types of goods and services restriction, a store specific restriction, a purpose of purchase rule, a purchase timing rule, a geographic restriction, and group purchase rule.

* * * * *